United States Patent [19]

Shimizu

[11] Patent Number: 5,709,968
[45] Date of Patent: Jan. 20, 1998

[54] NON-AQUEOUS ELECTROLYTE SECONDARY BATTERY

[75] Inventor: Ryuichi Shimizu, Tokyo, Japan

[73] Assignee: Sony Corporation, Tokyo, Japan

[21] Appl. No.: 653,457

[22] Filed: May 24, 1996

[30] Foreign Application Priority Data

May 26, 1995 [JP] Japan ................................. 7-127805
Oct. 31, 1995 [JP] Japan ................................. 7-284200

[51] Int. Cl.$^6$ ........................................ H01M 10/40
[52] U.S. Cl. ............................ 429/198; 429/248
[58] Field of Search ........................ 429/198, 61, 62, 429/248

[56] References Cited

U.S. PATENT DOCUMENTS

2,900,434  8/1959  Zimmerman et al. ............ 429/198 X
4,463,072  7/1984  Gifford et al. .................... 429/198 X
4,544,616  10/1985  Poa et al. ........................ 429/248 X
5,470,674  11/1995  Doddapaneni et al. .......... 429/198 X

Primary Examiner—Stephen Kalafut
Attorney, Agent, or Firm—Hill, Steadman & Simpson

[57] ABSTRACT

A non-aqueous electrolyte secondary battery capable of quickly interrupting overcharge current and overcharge reactions even if overcharged during charge with a great electric current so that thermal runaway occurring due to overcharge current is prevented. A benzene compound, into which a predetermined substitutional group has been induced, is added to the non-aqueous electrolyte of the non-aqueous electrolyte secondary battery.

5 Claims, 2 Drawing Sheets

NON-AQUEOUS ELECTROLYTE SECONDARY BATTERY

BACKGROUND OF THE INVENTION

1. Field of the Invention

The present invention relates a non-aqueous electrolyte secondary battery for obtaining electromotive force due to introduction and discharge of lithium ions, and more particularly to a technique for preventing overcharge occurring due to chemical reactions of additives to the battery.

2. Prior Art

Security is the most important consideration for a lithium secondary battery (non-aqueous electrolyte secondary battery). In particular, protection from overcharge is an important fact.

For example, if the charge voltage for, for example, a nickel-cadmium battery, has been raised, consumption of charge energy taking place due to chemical reactions of water causes an overcharge protective mechanism to act. However, the lithium secondary battery, which is the non-aqueous type secondary battery, must have another mechanism.

As an overcharge protective mechanism for the lithium secondary battery, there have been suggested a method using an electronic circuit, a method of mechanically interrupting an electric current by using gas generation when overcharge takes place, a shut down method using fusion of a separator and a method using chemical reactions of a reagent. However, each method has the following problem and, therefore, a satisfactory overcharge protective mechanism has not been realized yet.

The method using an electronic circuit or the method of mechanically interrupting an electric current causes the battery to have an additional structure. Therefore, the cost of the battery cannot be reduced and various limitations arise in designing a product of the battery.

The shut down method using fusion of a separator is a method using rise in the temperature of the battery when overcharge has taken place to fuse the separator with heat to close (shut down) a multiplicity of small apertures formed in the separator so as to interrupt the overcharge electric current. In the foregoing case, the separator is made of material which can relatively easily be fused.

Heat which raises the temperature of the battery is considered to be generated due to reactions of lithium of the negative pole deposited due to overcharge and metal oxides of the positive pole made unstable because lithium ions have been excessively drawn due to overcharge and the electrolyte. Since the foregoing heat generation takes place considerably rapidly, heat generation cannot be interrupted even after the separator has been shut down and, thus, the overcharge electric current has been interrupted. Therefore, the temperature of the battery is frequently raised excessively and thus a problem of thermal runaway arises. As a result, in practical batteries, the shut-down type separator has not been used to prevent overcharge but the same has been employed to prevent short circuit occurring with the outside of the battery.

Accordingly, another method has been energetically researched and developed which uses chemical reactions to prevent overcharge. For example, a method has been attempted in which an appropriate oxidation-reduction reagent is added to the electrolyte. In a case where the reversibility of the oxidation-reduction reagent is excellent, a protective mechanism is realized in which the reagent reciprocates between the positive pole and the negative pole to consume the overcharge electric current.

The foregoing oxidation-reduction reagent is called a "redox shuttle" or the like. Simplification of the safety apparatus of the lithium secondary battery by using the redox shuttle realizes advantages in that the cost can be reduced and lowering of the battery energy density occurring due to the safety apparatus can be prevented as compared with the electronic circuit method. As for possibility in applying the redox shuttle to the lithium secondary battery, a fact that application of ferrocene is advantageous in a case where the battery is a 3 V type battery has been suggested in, for example, Japanese Patent Application Laid-Open publication No. 1-206571 (1989).

However, since the oxidation-reduction potential of the ferrocene with respect to lithium is 3.1 V to 3.5 V, it cannot be adapted to a battery having higher battery voltage. For example, a carbon-LiCoO2-type lithium ion battery, which is a 4-V class battery, must employ a compound having an oxidation-reduction potential of about 4.0 V to about 4.5 V.

Further improvements resulted in a disclosure in Japanese Patent Application Laid-Open publication No. 6-338347 (1994) in which metal complexes, such as Fe (5-Cl-1, 10-phenanthroline)$_3$X$_2$ and Ru (phenanthroline)$_3$X$_2$ (where X is an anionic molecule), and cerium salts, such as Ce (HN$_4$)$_2$(NO$_3$)$_5$, have been suggested as oxidation-reduction reagents adaptable to the 4-V-class lithium ion secondary battery. Transition metals, such as Fe, Ru and Ce, which are the central metals of the oxidation-reduction reagents, have a plurality of stable oxidation-reduction states due to states of d-orbital or f-orbital. By coordinating appropriate ligands or by forming the same into solvated molecules, the oxidation-reduction potential can be controlled so that the foregoing transition metals are employed as preferred redox shuttles for the 4-V-class battery.

However, since each of the foregoing metal complexes and cerium salts has a structure such that large group of atoms surrounds the orbits of the central metals, they have large volume per molecular weight or per molecule. Therefore, the concentration and diffusion rate of the reagent molecules in the electrolyte are limited. Thus, there frequently arises a problem in that the effect of preventing overcharge cannot be obtained satisfactorily.

As another redox shuttle adaptable to the 4-V class battery, a compound has been disclosed in Japanese Patent Application Laid-open publication No. 7-302614 (1995) in which an electron donative substitutional group, such as an alkyl group or a methoxy group, is induced into a benzene ring. Since the foregoing compound has a small molecular weight and a small volume per molecule as compared with those of the metal complex and cerium salt, satisfactory solubility and operations to serve as a redox shuttle can be obtained.

However, since the redox shuttle has a theoretical limiting current, a satisfactory effect of preventing overcharge cannot be obtained if the overcharge electric current is greater than a predetermined value. Specifically, the limiting current of each of the redox shuttles, which have been suggested, is not sufficiently large with respect to overcharge occurring in a case where charge has been performed at a rate (current capacity/charge period) of 1, that is, charge has been performed with a constant current of 1C (Ah/h) or greater.

To prevent overcharge occurring with a great current, the foregoing method using an electronic circuit or the method of mechanically interrupting the electric current using generation of gas if overcharge takes place is relatively effective. Therefore, in a case where the redox shuttle is employed in a battery system in which charge is performed with a great electric current, the foregoing method must also be employed.

OBJECT AND SUMMARY OF THE INVENTION

In view of the foregoing, an object of the present invention is to provide a non-aqueous electrolyte secondary battery having a reagent satisfactorily serving as a mechanism of preventing overcharge even adapted to a 4-V-class battery which is charged with a great electric current and exhibiting high energy density and satisfactory safety and low cost.

To achieve the foregoing object, according to one aspect of the present invention, there is provided a non-aqueous electrolyte secondary battery including: a negative pole made of metal material mainly composed of lithium or carbon material capable doping and removing lithium; a positive pole made of a composite oxide of lithium and transition metal; and electrolyte which is non-aqueous electrolyte in which a support salt is dissolved in non-aqueous solvent, wherein the non-aqueous electrolyte contains a benzene compound having a small molecular weight, e.g., a molecular weight of 500 or less, more preferably 200 or less, and a reversible oxidation-reduction potential at a potential higher than a positive pole potential in a state where the non-aqueous electrolyte secondary battery is fully charged and having p-electron orbital, and the benzene compound is selected from the group consisting of a compound expressed by General Formulas [I] to [V]:

where R is an alkyl group, $A_1$, $A_2$, $A_3$, $A_4$ and $A_5$ are each H or halogen and at least any one of $A_1$, $A_2$, $A_3$, $A_4$ and $A_5$ is halogen;

where R is an alkyl group, $A_1$, $A_2$, $A_3$ and $A_4$ are each H or halogen and at least any one of $A_1$, $A_2$, $A_3$ and $A_4$ is halogen;

where R is an alkyl group, $A_1$, $A_2$, $A_3$ and $A_4$ are each H or halogen and at least any one of $A_1$, $A_2$, $A_3$ and $A_4$ is halogen;

where R is an alkyl group, $A_1$, $A_2$ and $A_3$ are each H or halogen and at least any one of $A_1$, $A_2$ and $A_3$ is halogen;

Where R is an alkyl group, $A_1$, $A_2$, $A_3$ and $A_4$ are each halogen.

The support electrolyte is $LiBF_4$ and the benzene compound is expressed by Formula VI:

It is preferable that the non-aqueous electrolyte secondary battery containing the benzene compound in the non-aqueous electrolyte thereof employs a polyolefin porous film is, as a separator, disposed between the positive pole and the negative pole.

Other objects, features and advantages of the invention will be evident from the following detailed description of the preferred embodiments described in conjunction with the attached drawings.

DETAILED DESCRIPTION OF THE PREFERRED EMBODIMENTS

Each of the foregoing benzene compounds acts as a mechanism for preventing overcharge. The mechanism for preventing overcharge is realized due to chemical reactions such that the benzene compound performs an oxidation-reduction reaction if the battery has been overcharged, and then the oxidized compounds continuously are dimerized to polymerized or adsorbed to the activated electrode or react with the same. The mechanism for preventing overcharge will now be described.

The benzene compound has an effect to serve as the redox shuttle, that is, an effect of consuming the overcharge current by the oxidation-reduction reactions.

The foregoing effect can be obtained because the benzene compound has an appropriate oxidation-reduction potential as the redox shuttle for a 4-V-class battery and is able to chemically stabilize oxidation species and reduction species by selecting a substitutional group.

That is, a covalent bond of two atoms of an organic compound, in principle, is such that two electrons forming a pair form one single bond. Therefore, when an organic compound is oxidized or reduced to remove or add one electron from an electron system of the bond of the organic compound, an unpaired electron is formed in the organic molecule compound. Although the unpaired electron can be stabilized when decomposition of the organic compound has been resulted in a novel bond with another molecule being formed, the state of the organic compound having the unpaired electron is instable in principle.

However, in a case where unpaired electrons exist on a delocalized orbit and spread over two or more atoms in a molecule as can be observed in a p-orbital of an aromatic series, the organic compound is able to relatively stably exist even if the organic compound has unpaired electrons. If the reaction active point at which the density of the unpaired electrons is high is protected from attacks of other molecules due to a steric hindrance of the substitutional group, the organic compound even having unpaired electrons is made to be more stable.

Since the oxidation-reduction potential is substantially determined depending upon the degree of spread of the unpaired electrons and the symmetry of the orbit, excess spread of the orbit causes an unsatisfactory state to be realized because the oxidation-reduction potential becomes inappropriate. Compounds of the types expressed by the foregoing General Formulas [I] to [V] and formula [VI] having a basic skeleton composed of the benzene ring, which is an aromatic ring having a relatively small molecular weight, are preferred compounds to serve as the redox shuttles in view of the oxidation-reduction potential.

Since the benzene ring, which is the basic skeleton of the foregoing compound, has a molecular weight of 78, the benzene ring has smaller molecular volume as compared with metal complex type molecule, such as metallocene, polypyridine complex or cerium ions. The foregoing fact means that the volume sharing in the electrolyte is small and the dispersion rate is high. Thus, a satisfactory operation can be performed as the redox shuttle.

The benzene compound has an effect of shutting down the separator, which is a porous polymer film.

The reason for this is that the benzene compound generates Joule heat as the overcharge current is consumed and performs heat generative reactions such that oxidation is performed and then the benzene compound continuously are dimerized to polymerized or adsorbed to the activated electrode or react with the same. As a result of generation of heat due to the reactions, the separator is fused with heat. Moreover, the dimerized or polymerized polymers deposit in the form of solids on the separator to contribute to shutting down of the separator.

Moreover, the benzene compounds adsorb to and react with the activated electrode so that overcharge reaction of the electrode is inhibited and a contribution to prevention of overcharge is made.

Therefore, a battery containing the foregoing benzene compound in the non-aqueous electrolyte thereof can be charged with a great electric current. If the non-aqueous electrolyte secondary battery has been overcharged, the operation of the redox shuttle of the benzene compound causes the overcharge current to be consumed so that proceeding of the overcharge reaction is inhibited. Moreover, generation of Joule heat as the overcharge current is consumed by the benzene compound, and heat generative reactions such as oxidation and then dimerization to polymerization of the benzene compound or adsorption to the activated electrode or reaction with the same cause the separator to be fused with heat or encounters solid deposition. Thus, the separator can be shut down. As a result, the overcharge current can be interrupted and also the overcharge reaction can be prevented.

Note that shutting down of the separator due to the heat fusion is the most important factor for contributing to the prevention of the overcharge reaction in the case of the overcharge with a great electric current.

The reason for this is that the heat generation due to the various reactions of the benzene compounds is enhanced as the electric current at the overcharge is made greater and the shutting down of the separator can easily take place. That is, shutting down of the separator due to the heat fusion has no upper limit electric current in a manner different from the effect of the redox shuttle. Thus, the shutting down can be performed considerably as the overcharging current is made larger.

Since heat generation taking place due to the benzene compound is closely relates to oxidation of the benzene compound, rise of the temperature is quickly interrupted after the overcharge current has been interrupted due to shutting down of the separator. Therefore, in a manner different from heat generation taking place in a case where no benzene compound is used, that is, heat generation due to reaction of lithium deposited on the negative pole or the metal oxide on the positive pole, which has been made instable, with the electrolyte, excess rise of the temperature of the battery causing thermal runaway to take place can be prevented. As a result, a significant advantage can be realized in improving security of the battery.

Note that the benzene compound for use to realize the overcharge preventive mechanism has alkyl group R, alkoxy group OR or H or halogen groups $A_1$ to $A_5$ induced thereto (two or more alkyl group or alkoxy groups may be annularly bonded to each other).

The selection of the substitutional group to be induced into the benzene ring is performed in mainly consideration of the characteristic of the substitutional group for attracting electrons or electron donative characteristic on the basis of the oxidation-reduction potential and the operating voltage range due to the p-electron orbital energy of the molecule.

That is, the oxidation-reduction potential of the organic compound is mainly determined depending upon the basic skeleton of the molecule thereof. The oxidation-reduction potential is varied by hundreds of mV depending upon the type of the electrolyte for dissolving the organic compound. Therefore, selection of the substitutional group must be selected appropriately to precisely adjust the potential.

A fact about the benzene compound has been known that a substitutional group of a type attracting electrons, in many cases, raises the oxidation-reduction potential and a substitutional group of an electron donative, in many cases lowers the oxidation-reduction potential. Moreover, effects of plural substitutional groups frequently exhibits reversible characteristic.

Among the substitutional groups to be induced into the benzene compound, the alkyl group and alkoxy group are electron donative substitutional group and mainly have an effect of adjusting the oxidation-reduction reaction potential. On the other hand, the halogen group, which is an electron attractive substitutional group, does not considerably affect the oxidation-reduction potential but has a function of improving the stability of the performance of the battery at high temperatures.

That is, the electron donative group of the benzene compound lowers the oxidation-reduction potential as described above and activates the electrophilic substitution reactions of the oxidizer in the system. On the other hand, the electron abstractive group deactivates the electrophilic substitution reactions.

Since $LiPF_6$ or the like, which is generally employed as a support salt in the electrolyte, is a strong Lewis salt, it sometimes becomes an oxidizer having strength capable of attacking the benzene compound if the temperature is relatively high.

In a battery system having strong Lewis acid, such as $LiPF_6$, as a support salt thereof, the effect of the halogen group deactivates the electrophilic substitution reactions due to $LiPF_6$ at high temperatures. As a result, the stability of the benzene compound at high temperatures can be improved and deterioration in the performance of the battery taking place due to oxidation of the benzene compound can be prevented.

The reason why the halogen group is selected as an electron attractive group for deactivating the electrophilic substitution reactions of the oxidizer is that the halogen group has a significant effect of deactivating the electrophilic substitutional reactions but a restrained effect of raising the oxidation-reduction potential. The reason for this is that the halogen group has a great resonant effect in the substitutional group. The resonant effect in the substitutional group lowers the oxidation-reduction potential because of non-localization of the molecule orbit.

In a case where relatively weak Lewis salt, such as $LiBF_4$, is employed as the support salt of the electrolyte, a benzene compound having no halogen group, as shown in Formula [VI], may be added to the electrolyte.

As described above, the molecular design of the benzene compound is performed in view of the oxidation-reduction potential and the stability at high temperatures. Moreover, a state having the unpaired electrons, that is, stability of the oxidation species, must be considered.

To cause the benzene compound, having the foregoing three functions as described above, to serve as the redox shuttle, the reduction species and oxidation species of the benzene compound must chemically be stable.

However, to cause the separator to be shut down or to inhibit the overcharge reactions of the electrode, the benzene compound must be dimerized, polymerized continuously to the oxidation, or absorbed to or allowed to react with the activated electrode. Therefore, in the case where the foregoing effect is expected, it is preferable that the oxidation species of the benzene compound be relatively instable.

The stability of the oxidation species of the benzene compound is controlled by the steric hindrance of the substitutional group. If the reaction active point, at which the density of unpaired electrons is high, is protected from attacks of other molecules due to the steric hindrance, the oxidation species are relatively stable. If the reaction active point is allowed to expose outside and, therefore, they can easily be attached by other molecules, the oxidation species are relatively instable.

That is, by controlling the steric hindrance due to the substitutional group, the stability of the oxidation species can be controlled. In a case where the effect of the redox shuttle is considered important, a substitutional group having a great steric hindrance must be employed to stable the oxidation species. In a case where shutting down of the separator is intended or the effect of inhibiting the overcharge reactions of the electrode is considered important, a substitutional group must be selected which has a relatively small steric hindrance to make the stability of the oxidation species to be relatively instable. The reactions of the dimerization and polymerization continued from the oxidation can easily be controlled by designing the substitutional group. Therefore, an overcharge preventive mechanism adaptable to the degree of the overcharge current can be established.

In view of the foregoing, it is preferable that the benzene compound among those shown in Table 1 be employed for a battery system having a negative pole made of carbon and a positive pole made of $LiCoO_2$. Note that Table 1 shows the composition formulas and molecular weights as well as constitutional formulas.

TABLE 1

| No. | CONSTITUTIONAL FORMULA | COMPOUND | COMPOSITION FORMULA | MOLECULAR WEIGHT |
|---|---|---|---|---|
| 1 | CH₃–C₆H₃(Cl)–CH₃ | 2-chloro-p-xylene | $C_8H_9Cl$ | 140.6 |
| 2 | OCH₃–C₆H₄–Cl | 4-chloro anisole | $C_7H_7ClO$ | 142.6 |

TABLE 1-continued

| No. | CONSTITUTIONAL FORMULA | COMPOUND | COMPOSITION FORMULA | MOLECULAR WEIGHT |
|---|---|---|---|---|
| 3 | OCH₃, F (2,4 positions) on benzene | 2,4-difluoro anisole | $C_7H_6F_2O$ | 144.1 |
| 4 | OCH₃, F (3,5 positions) on benzene | 3,5-difluoro anisole | $C_7H_6F_2O$ | 144.1 |
| 5 | OCH₃, F (4 position) on benzene | 4-fluoro anisole | $C_7H_7FO$ | 126.1 |
| 6 | OCH₃, Br (4 position) on benzene | 4-bromo anisole | $C_7H_7BrO$ | 187.0 |
| 7 | OCH₃, Cl (2 position) on benzene | 2-chloro anisole | $C_7H_7ClO$ | 142.6 |
| 8 | OCH₃, Cl (3 position) on benzene | 3-chloro anisole | $C_7H_7ClO$ | 142.6 |
| 9 | OCH₃, F (3 position) on benzene | 4-fluoro anisole | $C_7H_7FO$ | 126.1 |
| 10 | OCH₃, F (2,3,5,6 positions), CH₃ (4 position) on benzene | 2,3,5,6-tetrafluoro-4-methylanisole | $C_8H_6F_4O$ | 194.1 |
| 11 | CH₃, CH₃ (1,2 positions), Cl (4 position) on benzene | 4-chloro-o-xylene | $C_8H_9Cl$ | 140.6 |

TABLE 1-continued

| CONSTITUTIONAL No. FORMULA | COMPOUND | COMPOSITION FORMULA | MOLECULAR WEIGHT |
|---|---|---|---|
| 12 (CH₃, Br on benzene ring) | 4-bromo-m-xylene | $C_8H_9Br$ | 185.1 |
| 13 (CH₃, F, CH₃, CH₃ on benzene) | 2-fluoro mesitylene (2-fluoro-1,3,5-trimethyl benzene) | $C_9H_{11}F$ | 138.2 |
| 14 (OCH₃, F, F, OCH₃, F, F on benzene) | 1,2,4,5-tetrafluoro-3,6-dimethoxy benzene | $C_8H_6F_4O_2$ | 210.1 |
| 15 (CH₃, CH₃, CH₃ on benzene) | mesitylene (1,3,5-trimethyl benzene) | $C_9H_{12}$ | 120.2 |

The non-aqueous electrolyte secondary battery according to the present invention contains the foregoing benzene compound in the non-aqueous electrolyte thereof. As the separator to be disposed between the positive pole and the negative pole, the following material is employed.

As the active material of the negative pole, a carbonaceous material of a type capable of doping and removing lithium metal, lithium alloy and lithium is employed. The carbonaceous material is exemplified by pyrolytic carbon, coke (pitch coke, needle coke, or petroleum coke), graphite, glass-type carbon, material prepared by baking organic polymer compound (carbonated by baking furan resin or the like at appropriate temperatures), carbon fiber and activated carbon.

As the active material for the positive pole, a composite oxidized material of lithium transition metal, such as $LiCoO_2$, expressed by $Li_xMO_2$ (where M is one or more types of transition metals, preferably at least any one of Mn, Co and Ni, and x satisfies $0.05 \leq x \leq 1.10$).

As the separator to be disposed between the positive pole and the negative pole, the shutting down effect of the benzene compound must be obtained if the battery has been overcharged by selecting a porous film of material of a type that can easily be fused with heat generated due to various reactions of the benzene compound.

The material of the separator is exemplified by polyolefin, preferably polyethylene is a preferred material. Polyethylene has a relatively low melting temperature of about 110° C. In a battery comprising the separator made of polyethylene, the separator is shut down when the temperature has been raised to about 110° C. in the case where the overcharge state has been realized. Thus, the overcharge current can be interrupted so that the temperature of the benzene ring does not exceed 110° C. Although the separator may be composed of only the polyolefin porous film, a hybrid separator may be employed which is formed by stacking a polyolefin porous film and another porous film made of another polymer.

As the electrolyte, non-aqueous electrolyte in which a support salt is dissolved in a non-aqueous solvent is employed.

As the non-aqueous solvent, ethylene carbonate, propylene carbonate, dimethyl carbonate, methylethyl carbonate, g-butyrolactone, methyl propionate or ethyl propionate or their combination may be employed.

The support salt is exemplified by $LiPF_6$, $LiClO_4$, $LiBF_4$, $LiCF_3SO_3$, $LiAsF_6$, $LiN(CF_3SO_2)_2$ and $LiC(CF_2SO_2)_3$.

EXAMPLES

The present invention will now be described in detail on the basis of results of experiments.

Structure of Manufactured Battery

Figure 1:
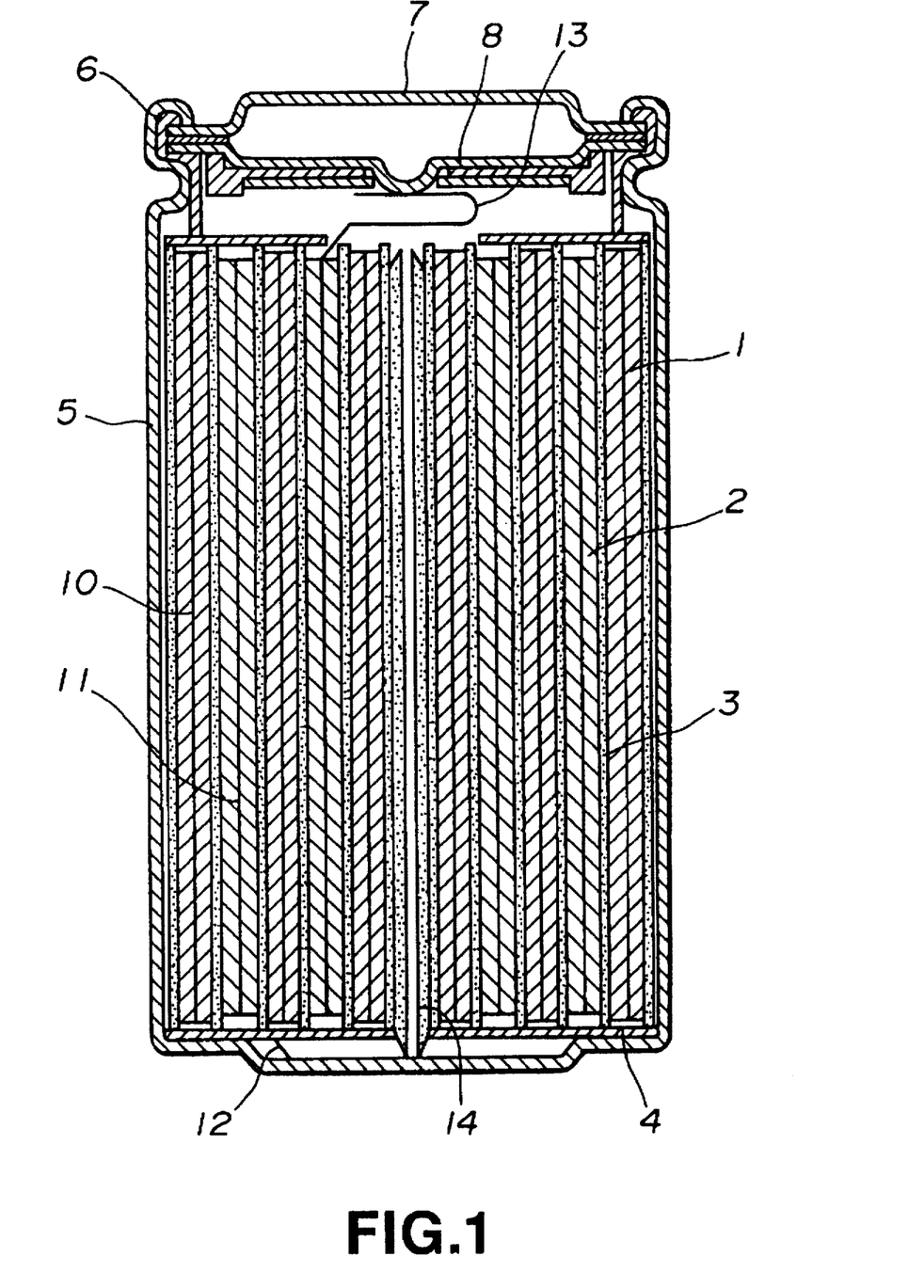
FIG. 1 is a vertical cross sectional view showing an example of the structure of a non-aqueous electrolyte secondary battery according to the present invention.

A non-aqueous electrolyte secondary battery manufactured in each example, to be described later, is shown in FIG. 1.

The non-aqueous electrolyte secondary battery has a structure such that a negative pole 1, comprising a negative pole collector 10 to which a negative pole active material is applied, and a positive pole 2 having a positive pole collector 11, to which a positive pole active material is applied, are wound through a separator 3, and a battery can 5 is accommodated in a state where an insulators 4 are disposed on the two vertical ends of the member formed by winding.

A battery covers 7 is attached to the battery can 5 by caulking through a gasket 6. The battery cover 7 is, through a negative pole lead 12 and a positive pole lead 13, electrically connected to the negative pole 1 or the positive pole 2 so as to be serve as a negative pole or a positive pole of the battery.

Note that the battery according to this embodiment has a structure such that the positive pole lead 13 is welded to a pressure release valve 8 provided with a cut portion having a predetermined length. Thus, the electrical connection with the battery cover 7 is established through the pressure release valve 8.

If the pressure in the battery having the foregoing structure has been raised, the foregoing cut portion of the pressure release valve 8 is widened. Thus, the internal pressure is released through the widened cut portion.

Example 1

In this example, the foregoing non-aqueous electrolyte secondary battery was manufactured as follows.

Initially, the negative pole 1 was manufactured as follows.

Pitch coke was pulverized so that carbon powder (negative pole material) having a mean particle size of 30 µm was obtained. 90 parts by weight of the thus-obtained carbon powder was mixed with 10 parts by weight of polyvinylidene fluoride (PVDF) serving as a binding agent. The negative pole mixture Was formed into a negative pole mixture slurry by dispersing N-methyl-2-pyrolidone, which was a solvent, so that a negative pole mixture slurry was obtained.

The negative pole mixture slurry was uniformly applied to the two sides of a belt-like copper foil having a thickness of 10 µm and serving as the negative pole collector 10, followed by being dried and followed by compressed and molded by a roll pressing machine so that the negative pole 1 was manufactured.

Then, the positive pole 2 was manufactured as follows.

Lithium carbonate and cobalt carbonate were mixed at a Li/Co (molar ratio) of 1, followed by baked in air at 900° C. for 5 hours so that $LiCoO_2$ (positive pole active material) was prepared. 91 parts by weight of a mixture, obtained by mixing 99.5 parts by weight of thus-prepared $LiCoO_2$ and 0.5 parts by weight of lithium carbonate, 6 parts by weight of graphite serving as a conductive material and 3 parts by weight of polyvinylidene fluoride (PVDF) were mixed. The thus-obtained positive pole mixture was dispersed in N-methyl-2-pyrolidone, which was a solvent so that a positive pole mixture slurry was obtained.

The positive pole mixture slurry was uniformly applied to the two sides of a belt-like aluminum foil having a thickness of 20 µm and serving as the positive pole collector 11, followed by being dried and followed by compressed and molded by a roll pressing machine so that the elongated positive pole 2 was manufactured.

Then, a fine porous polyethylene film (manufactured by Tonensha and having a thickness of 25 µm) with which the separator 3 was formed was prepared. The band-like negative pole 1 and the band-like positive pole 2 were stacked through the separator 3 followed by winding a multiplicity of times so that a spiral electrode element was manufactured. Note that the length and width of the spiral electrode element were adjusted so as to be appropriately accommodated in the battery can 5 having an outer diameter of 18 mm and a height of 65 mm.

The thus-manufactured spiral electrode element was accommodated in the battery can 5, and then the insulating plate 4 was disposed on each of the upper and lower surfaces of the thus-accommodated spiral electrode element. Then, nickel negative pole lead 12 was drawn from the negative pole collector 10 and then welded to the battery can 5. On the other hand, the aluminum positive pole lead 13 was drawn from the positive pole collector 11 and then welded to the aluminum pressure release valve 8 attached to the battery cover.

Then, electrolyte was injected into the battery can 5 in which the spiral electrode element has been accommodated. The electrolyte was prepared by, at a concentration of 1.0M, dissolving LiPF6 in a mixture solvent obtained by mixing propylene carbonate and methylethyl carbonate at a capacity ratio of 1:1, and by, at a concentration of 1.0M, dissolving 2-chloro-p-xylene. The foregoing electrolyte was injected into the battery can 5, and then a center pin 14 was inserted into the central portion of the spiral electrode element.

Finally, the battery can 5 was caulked through an insulating sealing gasket 6, to which asphalt had been applied, so that the battery cover 7 was secured. Thus, the non-aqueous electrolyte secondary battery having a diameter of 18 mm and a height of 65 mm was manufactured which was then charged with constant currents of 0.4 $mA/cm^2$ up to 4.2 V.

The standard capacity of the non-aqueous electrolyte secondary battery was 1000 mAh. The manufactured battery was subjected to a charge and discharge cycle test between 4.2 V and 2.5 V with a constant current of 0.75 $mA/cm^2$. As a result, the initial capacity was about 85% of the theoretical capacity of the positive pole and the capacity after 100 cycles was about 80% of the theoretical capacity of the positive pole. Thus, a fact was confirmed that the manufactured battery has a standard charge and discharge cycle performance as a battery.

Examples 2 to Example 14

A similar process to that according to Example 1 was performed except the benzene compound shown in Table 2-A and 2-B being employed as the electrolyte in place of 2-chloro-p-xylene so that a non-aqueous electrolyte secondary battery was manufactured.

Example 15

A similar process to that according to Example 1 was performed except mesitylene being dissolved in place of 2-chloro-p-xylene and $LiBF_4$ being dissolved in place of $LiPF_6$ so that a non-aqueous electrolyte secondary battery was manufactured.

Comparative Example 1

A similar process to that according to Example 1 was performed except that 2-chloro-p-xylene was not dissolved so that a non-aqueous electrolyte secondary battery was manufactured.

Evaluation of Effect of Preventing Overcharge

The thus-manufactured batteries were subjected to three cycles of charge and discharge cycle test between 4.2 V and 2.5 V with a constant current of 0.75 $mA/cm^2$. Then, an overcharge state was realized with a constant current of 3C (3A) to evaluate change in the voltage of the battery and the temperature of the same as the time passed.

Figure 2:
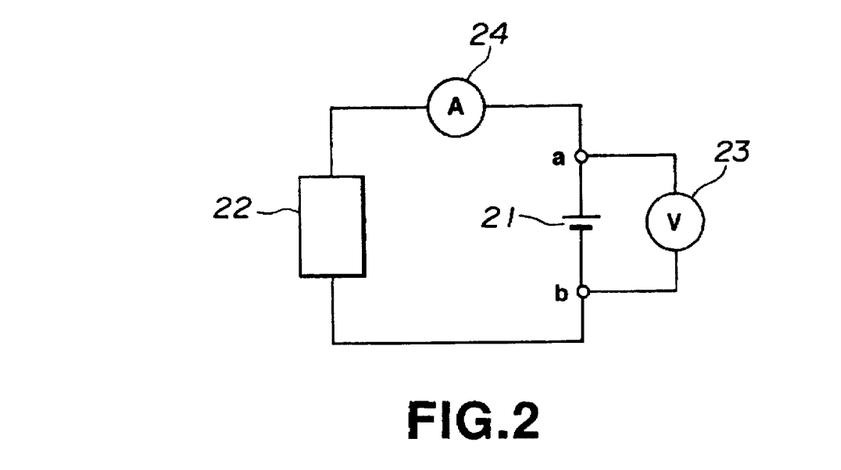
FIG. 2 is a schematic view showing a measurement circuit system for use in performing a constant electric current overcharge test of the non-aqueous electrolyte secondary battery.

A measurement circuit system for performing the overcharge test is shown in FIG. 2. In this measurement system, a terminal of a constant-current power source 22 and that of a voltmeter 23 are connected to the two terminals of the battery 21 so that an electric current is supplied from the constant-current power source 22. At this time, the terminal voltage of the battery 21 is detected by the voltmeter 23. An ampere meter 24 is connected at an intermediate portion between the constant-current power source 22 and the positive terminal of the battery 21 so that the electric current to be supplied from the constant-current power source 22 to the battery 21 is detected. A thermocouple is positioned in contact with the outer surface of the can of the battery 21 so that the temperature of the battery when charged is detected. Note that the upper voltage of the constant-current power source 22 was set to be 20 V.

As a result of the overcharge test, time required for the battery to generate heat, time required to interrupt the electric current and the highest temperature of the battery after the electric current had been interrupted as shown in Table 2 were resulted. As representative examples, the voltages at the terminal of the battery according to Example 1 and that according to Comparative Example 1 and the temperatures of the same as the time passed were shown in FIG. 3.

Figure 3:
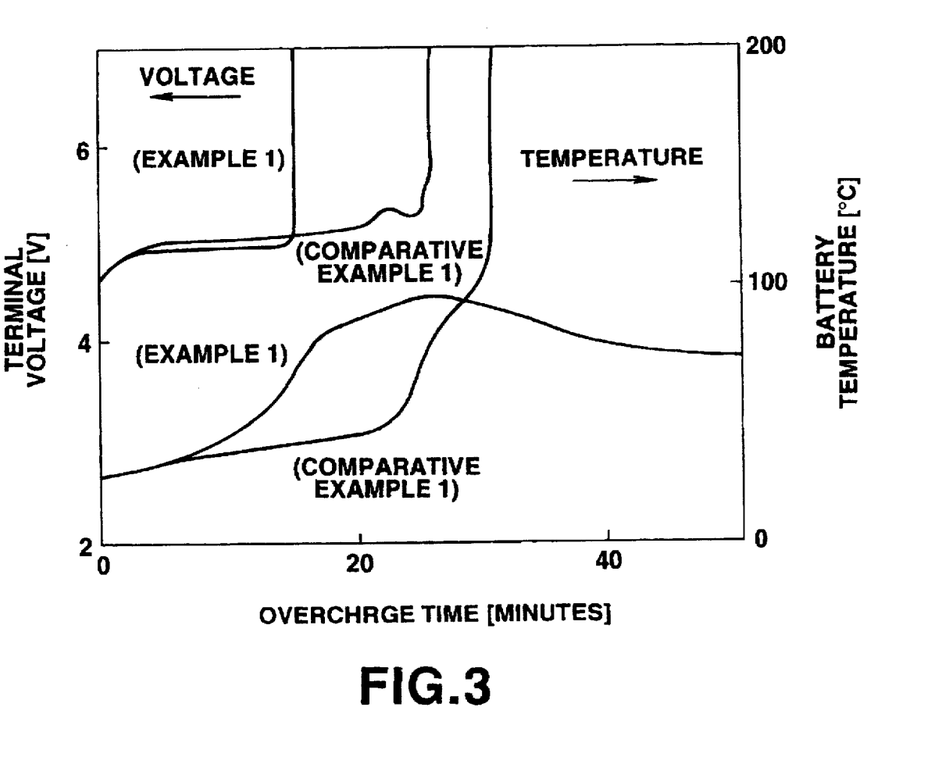
FIG. 3 is a graph showing the terminal voltage when the battery has been overcharged and change in the temperature of the battery as the time passes of a battery in which 2-chloro-p-xylene is added to the electrolyte thereof and a battery to which no 2-chloro-p-xylene is added to the electrolyte thereof.

Referring to FIG. 3, it can be understood that the terminal voltage of the battery according to Example 1 is rapidly raised 16 minutes after the battery has been overcharged. The moment at which the terminal voltage was rapidly raised was the moment at which the electric current was interrupted in the battery according to Example 1.

As for the temperature of the battery as the time passes, the temperature of the battery starts rising 8 minutes (battery voltage was about 4.87 V) after the overcharge state has been realized. The temperature of the battery at the moment at which the electric current has been interrupted, that is, 16 minutes after the overcharge state has been realized was about 80° C. After the electric current has been interrupted, the temperature of the battery rises moderately to about 100° C., and then it is gradually lowered after the temperature has been raised to 100° C.

As for the battery according to Comparative Example 1, the terminal voltage is rapidly raised 26 minutes after the battery has been overcharged. The moment at which 26 minutes have passed is the moment at which the electric current has been interrupted. As for the change in the temperature of the battery as the time passes, the temperature of the battery according to the Comparative Example 1 is rapidly raised 21 minutes (battery voltage was about 5.16 V) after the overcharge state has been realized.

The temperature of the battery at the moment at which the electric current has been interrupted, that is, 26 minutes after the overcharge state has been realized was about 80° C. In the foregoing case, rise in the temperature is continued even after the electric current has been interrupted, thus resulting in the temperature being raised to a level higher than 200° C. As a result, thermal runaway takes place.

The reason why the change in the temperature as the time passes is different between the battery according to Example 1 and Comparative Example 1 can be considered that the electrolyte of the battery according to Example 1 contains benzene compound dissolved therein but the electrolyte of the battery according to Comparative Example 1 does not contain dissolved benzene compound.

That is, the rise in the temperature of the battery according to Example 1 is due to consumption of the overcharge currents by the benzene compound dissolved in the electrolyte and ensuing heat generative reactions. Therefore, the temperature of the battery is raised relatively quickly so that the electric current is interrupted. After the electric current has been interrupted, the rise in the temperature is quickly interrupted.

On the other hand, the battery according to Comparative Example 1 does not contain any reagent for consuming the overcharge current in the electrolyte thereof. Therefore, the overcharge currents are accumulated in the electrode. Thus, the overcharge reactions proceed on the electrode, thus resulting in the electrode being made instable. The instable electrode rapidly reacts with the electrolyte and generates heat. As a result, although the moment at which start of rise in the temperature of the battery is slow, the temperature is rapidly raised after heat generation has been commenced. Therefore, the interruption of the electric current cannot be performed quickly, and the temperature of the battery is continuously raised even after the electric current has been interrupted. As a result, thermal runaway takes place.

As can be found from the foregoing phenomenon, addition of the benzene compound to the electrolyte is effective to enhance interruption of the electric current in a state where the battery has been overcharged and to prevent thermal runaway of the battery after the electric current has been interrupted.

TABLE 2-A

| NO. | Compound | Time Required to Start Heat Generation [min.] |
| --- | --- | --- |
| Example 1 | 2-chloro-p-xylene | 8 |
| Example 2 | 4-chloroanisole | 3 |
| Example 3 | 2,4-difluoroanisole | 8 |
| Example 4 | 3,5-difluoroanisole | 9 |
| Example 5 | 4-fluoroanisole | 2 |
| Example 6 | 4-bromoanisole | 2 |
| Example 7 | 2-chloroanisole | 4 |
| Example 8 | 3-chloroanisole | 4 |
| Example 9 | 3-fluoroanisole | 3 |
| Example 10 | 2,3,5,6-tetrafluoro-4-methylaniole | 12 |
| Example 11 | 4-chloro-o-xylene | 8 |
| Example 12 | 4-bromo-m-xylene | 8 |
| Example 13 | 2-fluoromesitylene | 6 |
| Example 14 | 1,2,4,5-tetrafluoro-3,6-dimethoxybenzene | 6 |
| Example 15 | mesitylene | 6 |
| Comparative Example 1 | — | 21 |

TABLE 2-B

| NO. | Time Required to Interrupt Electric Current [min.] | Highest Temperature of Battery after Electric Current has been Interrupted [°C.] |
| --- | --- | --- |
| Example 1 | 16 | 97 |
| Example 2 | 12 | 81 |
| Example 3 | 16 | 105 |
| Example 4 | 17 | 112 |
| Example 5 | 12 | 102 |
| Example 6 | 11 | 104 |
| Example 7 | 13 | 119 |
| Example 8 | 13 | 89 |
| Example 9 | 12 | 114 |
| Example 10 | 20 | 109 |
| Example 11 | 16 | 115 |
| Example 12 | 16 | 104 |
| Example 13 | 14 | 93 |
| Example 14 | 13 | 110 |
| Example 15 | 14 | 86 |
| Comparative Example 1 | 31 | Thermal Runaway |

Table 2-A and 2-B collectively shows the results of the battery according to Example 1, that according to Comparative Example 1 and a battery in which another benzene compound is added to the electrolyte in place of 2-chloro-p-xylene about the time required to start heat generation in a state where an overcharge state has been realized, time required to interrupt the electric current, and the temperature of the battery after the electric current has been interrupted.

As can be understood from Table 2, also the battery in which another benzene compound is added to the electrolyte has a similar tendency to that of the battery according to Example 1. That is, heat generation takes place quickly and the electric current can be interrupted quickly as compared with the battery according to Comparative Example 1. Moreover, the temperature of the battery after the electric current has been interrupted is limited to 80° C. to 120° C.

As a result, also the benzene compound employed in the batteries according to Example 2 to Example 15 can be considered to exhibit the effect of preventing overcharge similar to 2-chloro-p-xylene.

Since the charge current is set to a large value of 3C (3A) in the foregoing overcharge test, polarization of the electrode is made to be greater. Since the influence of the polarization must be considered, the voltage of the battery (the voltage of the battery at which heat generation is commenced) with respect to the reactive potential of the benzene compound cannot easily be specified.

Then, the batteries according to Example 1 to Example 15 were subjected to overcharge tests by using a similar measurement system except the charge current being set to be 1C (1A) to evaluate the voltage of the battery at which the battery commences generation of heat. Results are shown in Table 3.

TABLE 3

| NO. | Compound | Voltage at which Heat Generation is Commenced [V] |
|---|---|---|
| Example 1 | 2-chloro-p-xylene | 4.66 |
| Example 2 | 4-chloroanisole | 4.47 |
| Example 3 | 2,4-difluoroanisole | 4.61 |
| Example 4 | 3,5-difluoroanisole | 4.65 |
| Example 5 | 4-fluoroanisole | 4.45 |
| Example 6 | 4-bromoanisole | 4.46 |
| Example 7 | 2-chloroanisole | 4.51 |
| Example 8 | 3-chloroanisole | 4.52 |
| Example 9 | 3-fluoroanisole | 4.53 |
| Example 10 | 2,3,5,6-tetrafluoro-4-methylaniole | 4.75 |
| Example 11 | 4-chloro-o-xylene | 4.70 |
| Example 12 | 4-bromo-m-xylene | 4.66 |
| Example 13 | 2-fluoromesitylene | 4.57 |
| Example 14 | 1,2,4,5-tetrafluoro-3,6-dimethoxybenzene | 4.57 |
| Example 15 | mesitylene | 4.59 |

As shown in Table 3, the battery starts heat generation at a specific voltage of the battery depending upon the benzene compound added to the electrolyte thereof. Although the voltage of the battery is affected by the polarization by a degree of about 0.1 V to about 0.2 V, the voltage substantially corresponds to the reactive potential of the benzene compound.

Further detailed investigation resulted in a fact that the reactive potential of the benzene compound is made to be different depending upon the induced substitutional group. If a substitutional group exhibiting great electron donative characteristic is induced, the reactive potential is proportionally lowered. Referring to Table 2, heat generation proportionally starts in a battery containing the benzene compound exhibiting low reactive potential. Thus, the time taken to interrupt the electric current can be shortened.

Evaluation of Reserving Characteristic

Reserving characteristic of the batteries according to Example 1 to Example 15 and the battery (Comparative Example 2) according to Example 15 in which LiPF$_6$ was employed as the support salt in place of LiBF$_4$ was evaluated.

Each battery was subjected to a test as follows: charge and discharge were repeated three cycles between 4.2 to 2.5 V with a constant current of 0.75 mA/cm$^2$, and then the charged battery was reserved in a hot container set to be 90° C. for 8 hours. After the reservation has been completed, discharge was performed with a constant current of 0.75 mA/cm$^2$, followed by measuring the discharge capacity. Thus, the reservation ratio of the discharge capacity after the reservation with respect to the initial capacity was obtained. Results are shown in Table 4.

TABLE 4

| NO. | Compound | Support Salt | Reservation Ratio [%] |
|---|---|---|---|
| Example 1 | 2-chloro-p-xylene | LiPF$_6$ | 80 |
| Example 2 | 4-chloroanisole | LiPF$_6$ | 81 |
| Example 3 | 2,4-difluoroanisole | LiPF$_6$ | 85 |
| Example 4 | 3,5-difluoroanisole | LiPF$_6$ | 84 |
| Example 5 | 4-fluoroanisole | LiPF$_6$ | 82 |
| Example 6 | 4-bromoanisole | LiPF$_6$ | 80 |
| Example 7 | 2-chloroanisole | LiPF$_6$ | 81 |
| Example 8 | 3-chloroanisole | LiPF$_6$ | 82 |
| Example 9 | 3-fluoroanisole | LiPF$_6$ | 82 |
| Example 10 | 2,3,5,6-tetrafluoro-4-methylaniole | LiPF$_6$ | 84 |
| Example 11 | 4-chloro-o-xylene | LiPF$_6$ | 82 |
| Example 12 | 4-bromo-m-xylene | LiPF$_6$ | 84 |
| Example 13 | 2-fluoro-mesitylene | LiPF$_6$ | 82 |
| Example 14 | 1,2,4,5-tetrafluoro-3,6-dimethoxybenzene | LiPF$_6$ | 85 |
| Example 15 | mesitylene | LiBF$_4$ | 80 |
| Comparative Example 2 | mesitylene | LiPF$_6$ | 0 |

As shown in Table 4, the batteries according to Example 1 to Example 15 maintain a discharge capacity of 80% or higher even after reserved at the high temperature. The capacity reservation ratio is similar to that of the battery according to Comparative Example 1 in which no benzene compound is added to the electrolyte thereof. Thus, it was confirmed that even if the benzene compound is contained in the electrolyte employed in the battery, the high temperature stability of the battery is not affected adversely.

Among the batteries of a type employing mesitylene as the benzene compound, the battery according to Example 15 which employs LiBF$_4$ as the support salt enabled the capacity of 80% to be maintained after reserved at the high temperature. The battery according to Comparative Example 2 which employs LiPF$_6$ as the support salt encounters instantaneous lowering of the voltage of the battery to 2.5 V or lower. The discharge capacity was substantially zero.

As a result, in consideration of the reservation characteristic at high temperature, in the case where mesitylene, into which no halogen group has been induced is added to the electrolyte, the support salt, such as LiPF$_6$, serving as strong Lewis acid, is not a preferred support salt. Thus, weal Lewis acid, such as LiBF4, must be employed.

As can be understood from the foregoing description, the non-aqueous electrolyte secondary battery according to the present invention has the structure such that the benzene compound, into which a predetermined substitutional group has been induced, is added to the non-aqueous electrolyte. Therefore, even if the battery has been overcharged during charging with a great electric current, the benzene compound quickly interrupts the overcharge current. Thus, the overcharge reactions on the electrode can be interrupted. Simultaneously with interruption of the overcharge current, rise in the temperature of the battery can be prevented so that thermal runaway of the battery is prevented. Therefore, according to the present invention, the safety and reliability of the battery can be improved.

The mechanism for preventing overcharge can be obtained by simply adding the benzene compound as the reagent without a necessity of providing additional structure, such as an electronic circuit, to the battery. Therefore, the cost of the battery is not enlarged and the energy density can be maintained.

Therefore, a light-weight, large capacity, long-life and low cost secondary battery can be provided. Moreover, since the battery according to the present invention exhibits excellent safety and reliability, it can be used widely for, for example, a portable unit, a battery for a bicycle, an electric automobile, road leveling and the like. Thus, significantly multi-purpose characteristic can be obtained.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A non-aqueous electrolyte secondary battery comprising:

a negative pole made of metal material mainly composed of lithium or carbon material capable doping and removing lithium;

a positive pole made of a composite oxide of lithium and transition metal; and electrolyte which is non-aqueous electrolyte in which a support salt is dissolved in non-aqueous solvent, wherein the non-aqueous electrolyte contains a benzene compound having a reversible oxidation-reduction potential at a potential higher than a positive pole potential in a state where said non-aqueous electrolyte secondary battery is fully charged and having p-electron orbital, and the benzene compound is selected from the group consisting of a compound expressed by General Formulas [I] to [V]:

where R is an alkyl group, $A_1$, $A_2$, $A_3$, $A_4$ and $A_5$ are each H or halogen and at least one of $A_1$, $A_2$, $A_3$, $A_4$ and $A_5$ is halogen;

where R is an alkyl group, $A_1$, $A_2$, $A_3$ and $A_4$ are each H or halogen and at least any one of $A_1$, $A_2$, $A_3$ and $A_4$ is halogen;

where R is an alkyl group, $A_1$, $A_2$, $A_3$ and $A_4$ are each H or halogen and at least any one of $A_1$, $A_2$, $A_3$ and $A_4$ is halogen;

where R is an alkyl group, $A_1$, $A_2$ and $A_3$ are each H or halogen and at least any one of $A_1$, $A_2$ and $A_3$ is halogen;

where R is an alkyl group, $A_1$, $A_2$, $A_3$ and $A_4$ are each halogen.

2. A non-aqueous electrolyte secondary battery according to claim 1, wherein the benzene compound is selected from the group consisting of:

-continued and

3. A non-aqueous electrolyte secondary battery comprising:
   a negative pole made of metal material mainly composed of lithium or carbon material capable doping and removing lithium;
   a positive pole made of a composite oxide of lithium and transition metal; and
   electrolyte which is non-aqueous electrolyte in which a LiBF4 is dissolved in non-aqueous solvent, wherein the non-aqueous electrolyte contains a benzene compound having a reversible oxidation-reduction potential at a potential higher than a positive pole potential in a state where said non-aqueous electrolyte secondary battery is fully charged and having p-electron orbital, and the benzene compound is one expressed by the formula:

4. A non-aqueous electrolyte secondary battery according to claim 1, wherein a polyolefin porous film is, as a separator, disposed between said positive pole and said negative pole.

5. A non-aqueous electrolyte secondary battery according to claim 3, wherein a polyolefin porous film is, as a separator, disposed between said positive pole and said negative pole.

* * * * *